US010345825B2

(12) United States Patent
Erickson et al.

(10) Patent No.: US 10,345,825 B2
(45) Date of Patent: Jul. 9, 2019

(54) DETECTING AN ILLUMINATION NEED

(71) Applicant: International Business Machines Corporation, Armonk, NY (US)

(72) Inventors: Thomas D. Erickson, Minneapolis, MN (US); Clifford A. Pickover, Yorktown Heights, NY (US); Maja Vukovic, New York, NY (US); Komminist Weldemariam, Nairobi (KE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/396,915

(22) Filed: Jan. 3, 2017

(65) Prior Publication Data

US 2018/0188728 A1    Jul. 5, 2018

(51) Int. Cl.
*G01C 22/00* (2006.01)
*G05D 1/10* (2006.01)
*G06Q 10/00* (2012.01)

(52) U.S. Cl.
CPC ............. *G05D 1/104* (2013.01); *G06Q 10/00* (2013.01)

(58) Field of Classification Search
CPC . G05D 1/0088; G05D 1/0291; G05B 13/0265
USPC ............ 701/27; 382/103; 250/332; 362/470, 362/233, 85
See application file for complete search history.

(56) References Cited

U.S. PATENT DOCUMENTS

| 8,434,920 B2 * | 5/2013 | Jones | B64C 39/024 362/233 |
| 2013/0233964 A1 * | 9/2013 | Woodworth | B64C 37/02 244/2 |
| 2016/0225264 A1 * | 8/2016 | Taveira | B64C 39/024 |
| 2016/0284256 A1 * | 9/2016 | Wigell | G09F 21/06 |
| 2016/0291589 A1 * | 10/2016 | Ashoori | G01S 19/13 |
| 2017/0180754 A1 * | 6/2017 | Wu | H04N 19/57 |
| 2017/0334558 A1 * | 11/2017 | Erickson | B64C 39/024 |
| 2018/0008797 A1 * | 1/2018 | Kozloski | A61M 21/00 |

OTHER PUBLICATIONS

Author:—Adele Peters,On a Dark Street, You Can Summon These Drones to Light Your Way Home,Nov. 18, 2016,Link:—https://www.fastcompany.com/3065759/on-a-dark-street-you-can-summon-these-drones-to-light-your-way-home (Year: 2016).*
Mel, et al. "The NIST Definition of Cloud Computing". Recommendations of the National Institute of Standards and Technology. Nov. 16, 2015.

* cited by examiner

*Primary Examiner* — Shardul D Patel
(74) *Attorney, Agent, or Firm* — L. Jeffrey Kelly, Esq.; McGinn IP Law Group, PLLC

(57) ABSTRACT

A drone road lighting method, system, and computer program product, includes detecting a need for illumination near a road and deploying a drone to perform an illumination action based on the detected need.

20 Claims, 5 Drawing Sheets

DRONE ROAD LIGHTING METHOD 100

DETECTING AN ILLUMINATION NEED

BACKGROUND

The present invention relates generally to a drone road lighting method, and more particularly, but not by way of limitation, to a system, method, and computer program product for detecting a need for illumination near a road and using a drone to provide the needed illumination.

Depending on the concentration of the droplets, visibility in fog can range from the appearance of haze, to almost zero visibility. Other weather events or manmade causes can result in poor lighting for vehicles to navigate streets. Many lives are lost each year worldwide from accidents involving fog, weather, or manmade conditions on the highways, including multiple-vehicle collisions.

SUMMARY

In an exemplary embodiment, the present invention can provide a computer-implemented drone road lighting method, the method including detecting a need for illumination near a road and deploying a drone to perform an illumination action based on the detected need.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
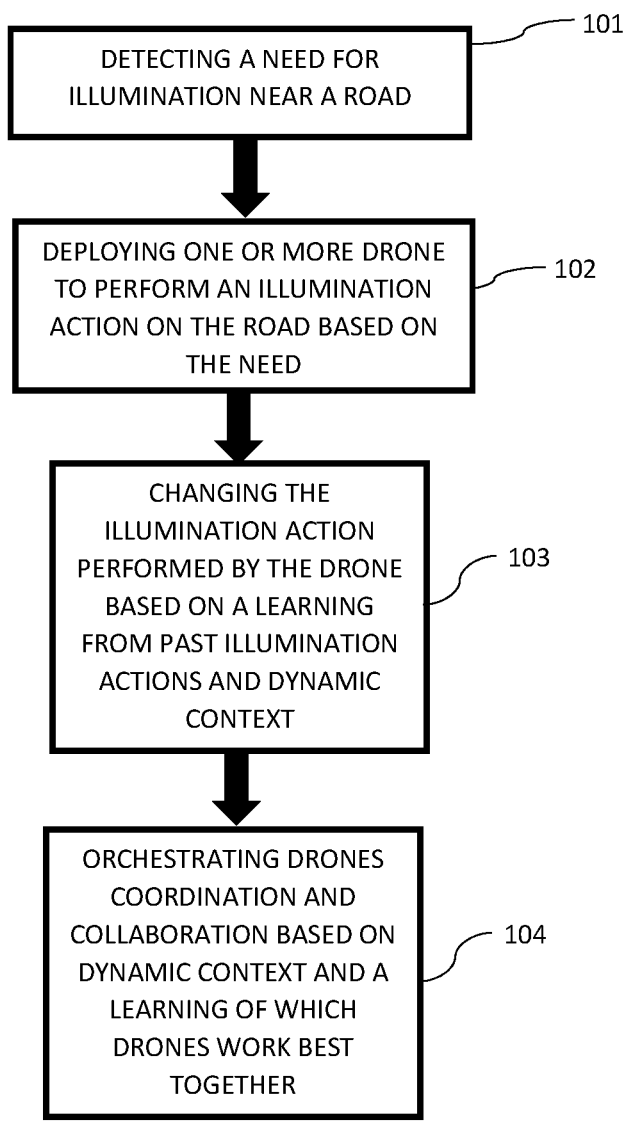
FIG. 1 exemplarily shows a high-level flow chart for a drone road lighting method 100.

The invention will now be described with reference to FIG. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the drone road lighting method 100 includes various steps to detect a need for illumination near a road (e.g. during inclement weather, such as fog, rain, snow, haze, smog, etc.), and, based on the need, deploying one or more drones (e.g., drown swarm) with illumination capabilities near the road with the need. As shown in at least FIG. 3, one or more computers of a computer system 12 according to an embodiment of the present invention can include a memory 28 having instructions stored in a storage system to perform the steps of FIG. 1.

Thus, the drone road lighting method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 3-5) may be implemented in a cloud environment 50 (see e.g., FIG. 4), it is nonetheless understood that the present invention can be implemented outside of the cloud environment.

In step 101, a need for illumination near a road (e.g., during inclement weather such as fog, rain, snow, haze, smog, etc.) is detected. The detection of the need for illumination may be based on, for example, weather, fog, rain, snow, lack of illumination, a presence of vehicles, presence of vehicles close to each other, vehicles swerving out of their lane, a lack of a guard rail near the road, driving style of one or more drivers, the presence of pedestrians, a history of accidents, a road topology (e.g., sharp curves, near edges of ravines, etc.), smoke from a fire, smog, etc.

Figure 2:
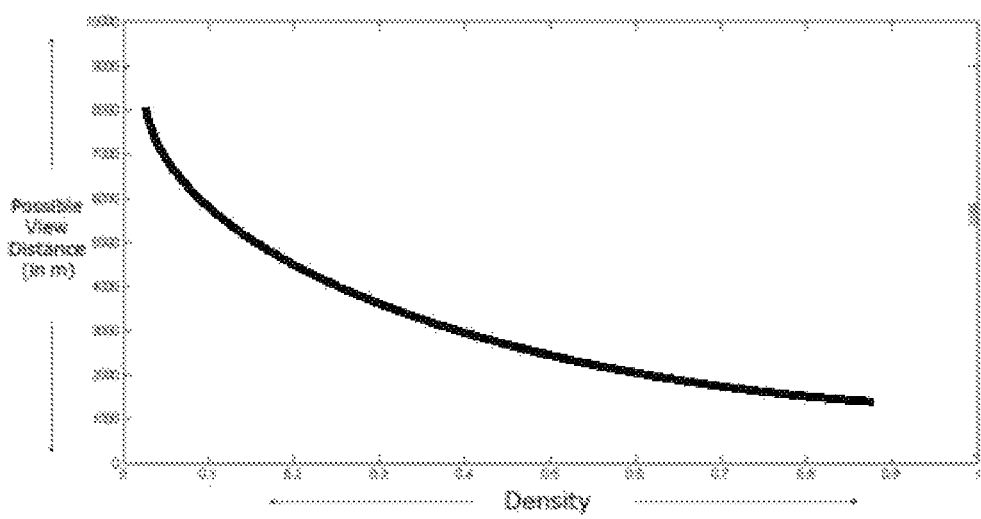
FIG. 2 exemplarily shows a graph depicting an effect of fog density on view distance.

The detection of need may be based, in part, on the detection of fog density and view distance mathematical curves as exemplarily depicted in FIG. 2. That is, the graph depicts an effect of fog density on view distance, where at a density of zero the view distance is 9 km, at a density of 0.2 the view distance is 5 km, and at a density of 0.6 the view distance is 1 km.

In step 102, a drone or drones (e.g., a drone swarm) is deployed to the road based on the need. The drone deployment positioning near the road may be based on algorithms to determine a useful lighting pattern.

In some embodiments, the illumination need can be pre-determined based expected event or can be learned based on one or more dynamic events (e.g., a weather forecast, road condition) and the drones may be pre-deployed to an area based on the expected event of, for example, radiation fog, ground fog, advection fog, evaporation fog or steam fog, ice fog, freezing fog, precipitation fog, hail fog, upslope fog, etc.

The illumination near the road can comprise illuminating the road to limit the effects of fog. However, the invention is not limited to illuminating the road to limit weather effects. The illuminating can include illuminating directional indicators for pedestrians or traffic to follow, creating road signs to alleviate traffic caused by weather, etc. That is, drones may also be deployed to provide illumination for, or of, particular vehicles (e.g., those moving very slowly or rapidly relative to other traffic) by moving in synchrony with the vehicles. This approach could also be applied to cohorts of vehicles. For example, in some embodiments, the lights on the drones can establish communication with emergency service vehicles (e.g. in response to a fire breaking out, a huge fog/smoke area is formed) to guide the said vehicles to a safest path while lighting road lighting lamps. In resource-constrained areas where power outage is frequent, the drone may contain a power outage detector and may decide to fly and activate lighting on critical parts of the roads (e.g., road to the hospital, police station, etc.).

In some locations, the weather can prevent drivers from seeing obstructions in the road or path. When the need for illumination is triggered by fog density (or the like), the illumination action by the drone can include an alert for the presence of animals, debris, potholes, etc. For example, in Africa, there may be several animals (e.g. donkeys) on the road, and typically under foggy situations, the animals may be difficult to see.

The drones may be pre-deployed to an area based on an imminent forecast of, for example, radiation fog, ground fog, advection fog, evaporation fog or steam fog, ice fog, freezing fog, precipitation fog, hail fog, upslope fog, etc.

In some embodiments, social networks can be used to detect patterns in driving behavior and predict actions to be taken by drones. The behavior of drones relative to the users social networks can be estimated and used to predict the new behavior of drones in relative to social network, as well as drivers and their behavior.

It is noted that the drone may not actually illuminate the road itself, and instead the drone(s) may be deployed to station themselves along and above an edge of a road (e.g., at the edge of a curving road near the edge of a dangerous ravine) to form a "virtual guard rail" in the form of a set of lights that are visually obvious to the driver. That is, the drones may be deployed to form a visually obvious boundary in the form of a rail or fence with a light pattern (e.g., a temporary fence via the light pattern).

In step 103, the drone deployment pattern may change based on learning such as learning changes in weather or drivers, etc.—to help orient and warn drivers. That is, the best illumination paths or types of lights to use for illumination can be learned based on past illumination actions. For example, the learning may include active learning, where cohorts of humans as well as drones may provide active feedback on drone performance in a certain weather context. The learning can learn how to correctly classify weather patterns, learn which drones are most suitable/perform the best in a certain context, and learn which drones work best together. The learning of which drones work best together may be used to pair drones for efficient execution of tasks, may be used for sharing personality between drones or for swapping personality whenever necessary.

In some embodiments, the drones may be equipped with fog lights. Conventionally, a fog light's color is yellow because it is the only color which possesses the longest wavelength among all visible lights. Yellow color fog lighting reduces dispersion, and the light hits and scatters the water vapor. Most fog lamps are spherical in shape and contain simple components. Alternatively, the drones can carry one or more anti-fog LED lights, anti-fog LED yellow light caution lamps, and LED white light road lighting lamps, etc.

In some embodiments, the drones can be equipped with an internally arranged circuit panel of fog-light controller, the circuit panel comprising a stroboscopic control module and a brilliance control module to control the illumination action based on the illumination need. Also, a drone lamp structure can regulate the illumination light color. The light source may contain a plurality of light emitting diodes (LEDs) with different wavelengths. The light source can emit light colors at a wavelength range of 540 to 640 nm (or the like). The control module can turn on or turn off the light source under different environments for visible degrees, so as to provide clear illumination effect for users.

In some embodiments, the drone can include a fog removal system (e.g., as the illumination action) which can blow dry air onto roads, airport runways, harbors, or into coastal areas in which fog regularly occurs to reduce the relative humidity of atmospheric air, thereby to reduce the fog. A heating unit and a blowing unit may be connected to areas such as roads, airport runways, harbors, or coastal areas in which fog regularly occurs, to blow dry air generated in the heating unit over a long range using a strong blowing pressure from the blowing unit.

In other embodiments, the drone may include a system for detecting, at night, the presence of an element such as fog interfering with the visibility of a road scene situated (e.g. potholes, obstacles, animals, etc.) in front of a vehicle. The drone can acquire an image of the road scene, extracts, from the image of the road scene, at least one light halo produced by a lighting device of the vehicle, approximating a form of this light halo by an elliptic curve, and comparing the form of this light halo with the elliptic curve obtained in order to deduce therefrom the presence or absence of an element interfering with visibility.

In step 104, a drone orchestration module may be used that uses a dynamically changing context (e.g., weather, road condition) and a learning of which drones work best together to coordinate the collaboration between one or more drones or drone swarm with different personality, for example, orchestration a drone(s) for road lighting, a drone (s) for fog removal, etc.

In one embodiment, in step 101, the illumination need can be detected by factoring the presence of fog and measuring the visibility distance in daytime conditions. For example, an expression (e.g., Koschmieder model) of the luminance of an object observed at a distance "d" as shown in equation (1) can be used:

$$L = L_0 e^{-kd} + L_f (1 - e^{-kd}) \qquad (1)$$

In equation (1), $L_0$ is the intrinsic luminance of the object, k is the coefficient of extinction of the fog and $L_f$ is the luminance of the ambient fog caused by the many diffusions of the light in the atmosphere. The parameters of the Koschmieder model are calculated on homogeneous sky/road regions.

An alternative embodiment to illuminating roadways can be done by providing moving illumination via the drones (e.g., the illumination action) that assist particular vehicles that would otherwise be in particular danger or pose a particular hazard to other vehicles or traffic in general. In one instance of this approach, the speed of the vehicles may be monitored either by the drones themselves or by some other method (e.g., onboard Global Position Systems (GPS)). Because conditions may not be ideal for producing accurate estimates based on direct observations, a Kalman filter may be used to improve estimates of both vehicular speed and its variance.

Further, in step 101, vehicles that are moving at either high or low speeds relative to other traffic in the area may be singled out for assistance (e.g., prioritized the illumination need for these vehicles). Similarly, vehicles that are exhibiting extreme levels of variance relative to other vehicles may also be singled out for assistance. One form of assistance might be for a drone to provide extra illumination for a vehicle (e.g., an ambulance or other emergency vehicles)

moving at a relatively high rate of speed by flying ahead of the vehicle. Another form of assistance might be for a drone to trail a slow-moving vehicle (or perch on its 'stern') to provide extra warning for traffic approaching from behind. This form of assistance could also be provided for areas where the combination of road characteristics and weather conditions render the area particularly hazardous, or where, historically, there have been many mishaps under similar conditions. This form of assistance could also be provided as a service available for purchase, or provided through a service organization. Also, the approach of providing illumination assistance for particular vehicles could be made more efficient by facilitating the formation of vehicle cohorts that could be guided through a foggy area. Knowing that extra illumination would be provided for a vehicle cohort of a particular size could serve as an incentive for vehicles to form cohorts.

It is noted that the description of the method 100 may utilize an autonomous flying drone (or swarm of drones) but the invention is not limited to drones. That is, any fixed wing aircraft can also perform the method and include the system and computer program product. The drone performing the method 100 includes various sensors and illumination devices to detect and/or illuminate roads. Many modifications and variations of the drones will be apparent to those of ordinary skill in the art without departing from the scope and spirit of the described embodiments.

Further, it is noted that although the term "road" is used to describe an area of need for illumination, the invention is not limited to a "road". That is, the need for illumination near any area (e.g., river, ocean, air space, etc.) being limited by weather or the like can be detected and a drone deployed to the area.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
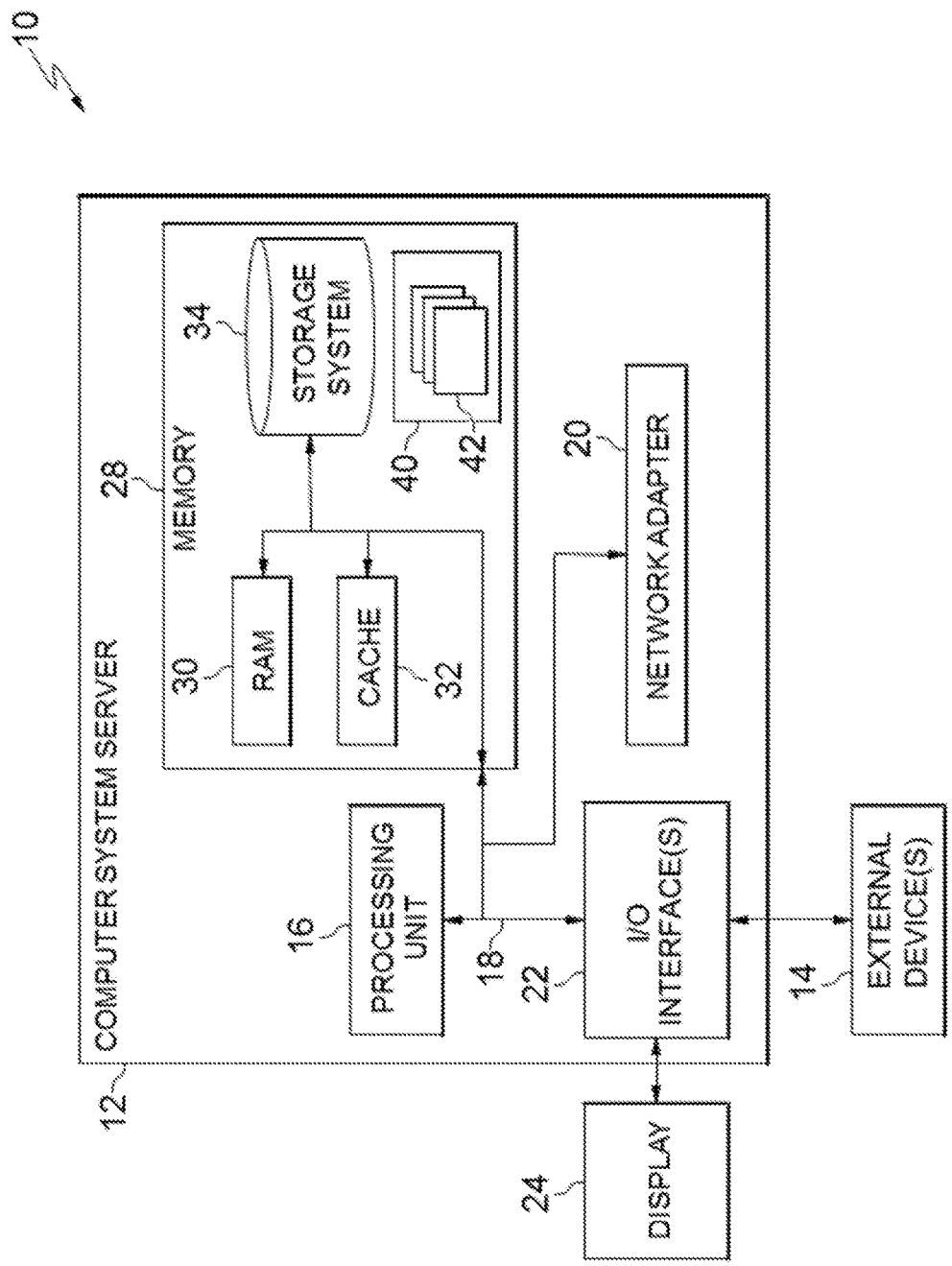
FIG. 3 depicts a cloud computing node 10 according to an embodiment of the present invention.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 3, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
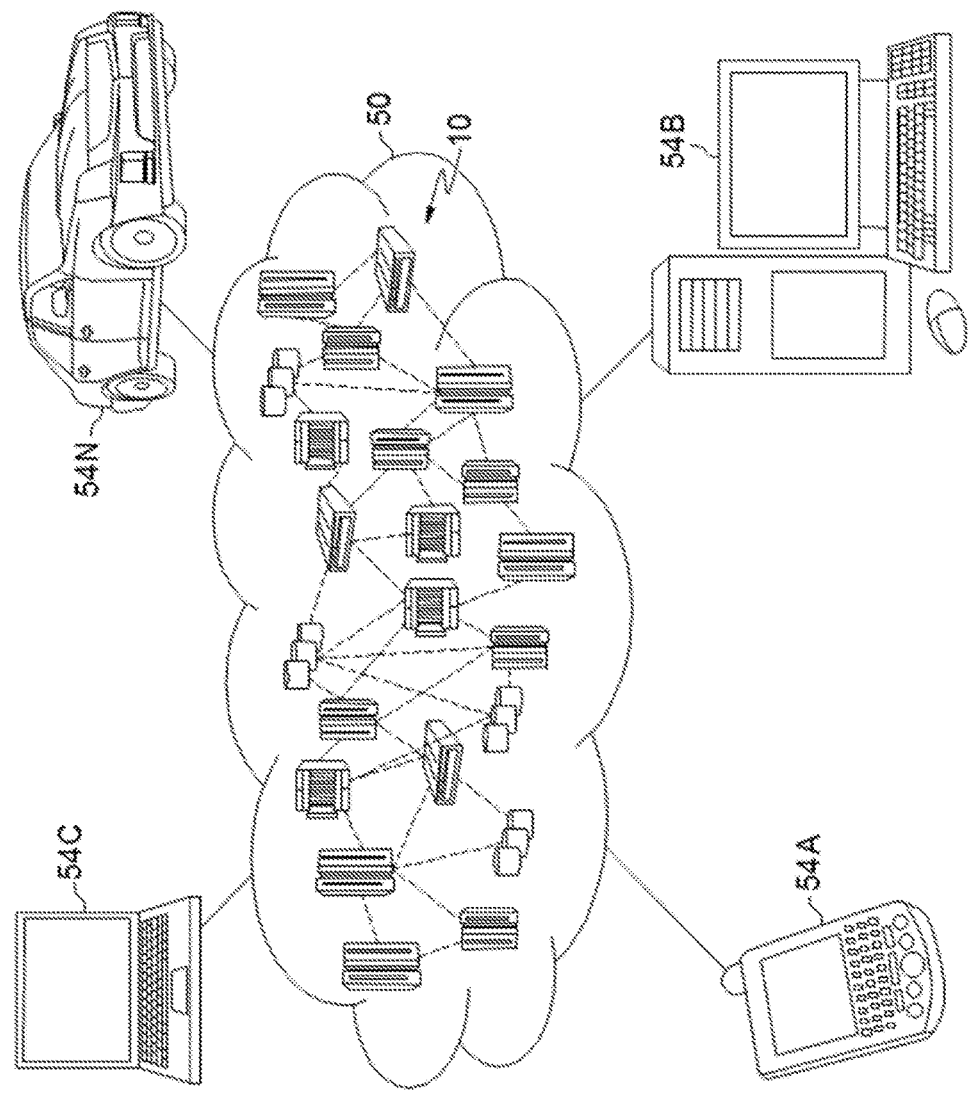
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
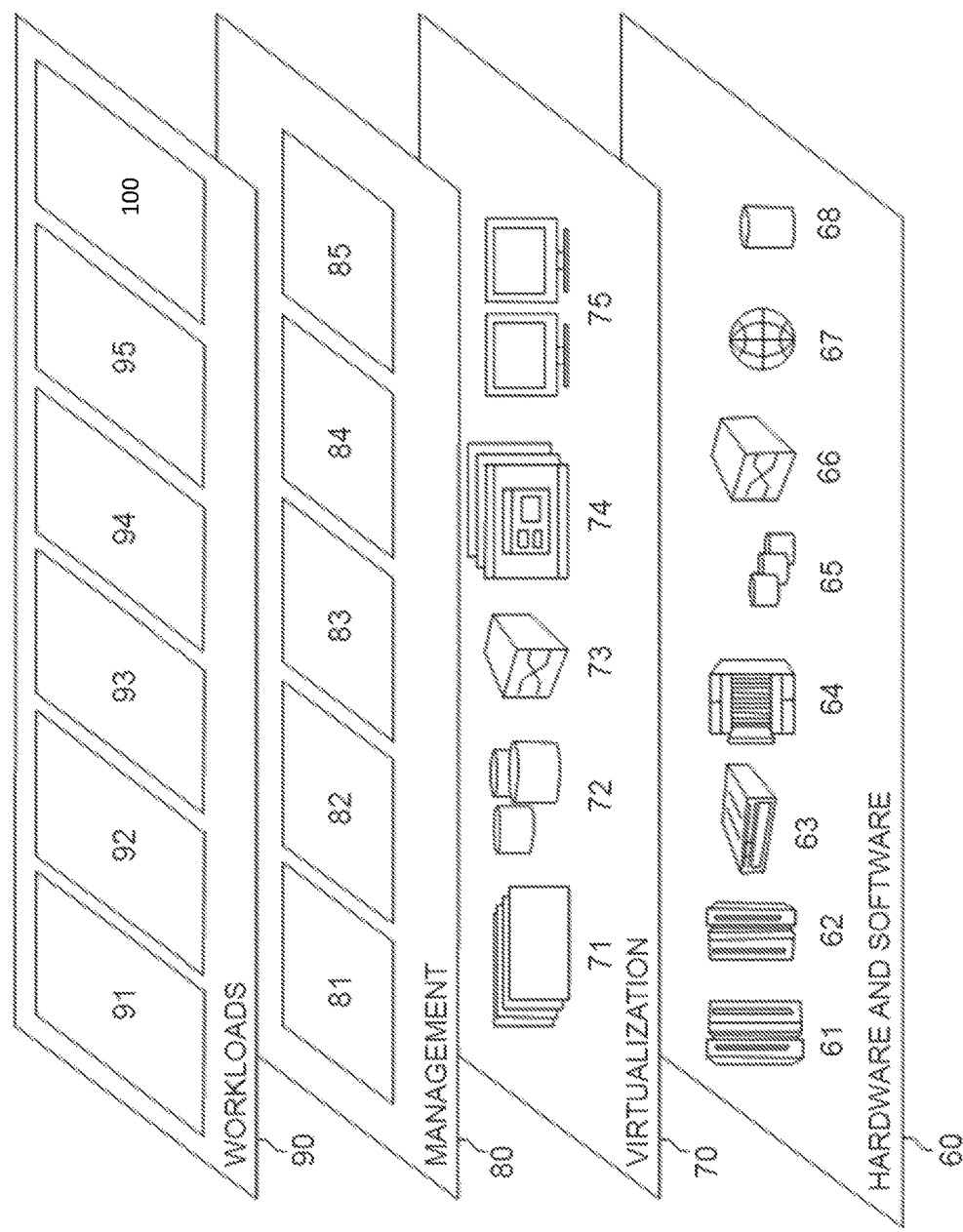
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the drone road lighting method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented drone road lighting method, the method comprising:
    detecting a need, irrespective of a user request, for illumination near a road based on a detrimental condition of the road;
    automatically deploying a drone to perform an illumination action based on the detected need; and
    changing the illumination action performed by the drone based on a learning from past illumination actions of the drone,
    wherein the detecting includes a sensing that enables a tracking of the need.

2. The computer-implemented method of claim 1, wherein the need for illumination is detected based on at least one of:
    weather;
    fog;
    rain;
    snow;
    a lack of illumination;
    a presence of a vehicle;
    a presence of a vehicle close to another vehicle;
    a vehicle swerving out of a lane on the road;
    a lack of a guard rail near the road;
    a driving style of one or more drivers of a vehicle;
    a presence of pedestrians;
    a history of accidents;
    a topology of the road;
    smoke; and
    smog.

3. The computer-implemented method of claim 1, wherein the deploying controls a positioning of the drone based on causing a lighting pattern near the road to illuminate the road, and
    wherein the deploying controls a positioning of a plurality of drones such that the drones form a visual boundary near an edge of the road with a light pattern emitted from the drones.

4. The computer-implemented method of claim 1, wherein the detecting detects the need for illumination when a fog density exceeds a predetermined threshold and according to a view distance based on the fog density.

5. The computer-implemented method of claim 1, wherein the deploying pre-deploys the drone to an area based on a pre-determined weather forecast.

6. The computer-implemented method of claim 1, wherein the drone includes a fog light mounted on the drone to perform the illumination action.

7. The computer-implemented method of claim 1, wherein the illumination action includes using a fog suppression system installed on a plurality of drones to blow dry air onto the road in order to suppress a fog density.

8. The computer-implemented method of claim 1, wherein the detecting further detects a presence of an obstacle in the road that cannot be viewed due to the need for illumination.

9. The computer-implemented method of claim 1, wherein, when the need for illumination is detected, the detecting further acquires an image of the road, extracts, from the image of the road, at least one light halo produced by a lighting device of a vehicle, approximates a form of the light halo by an elliptic curve, and compares the form of the light halo with the elliptic curve obtained in order to deduce from the light halo a presence of an element obstacle with visibility.

10. The computer-implemented method of claim 1, embodied in a cloud-computing environment.

11. The computer-implemented method of claim 1, wherein the need is pre-detected from a report of the detrimental condition such that the drone is deployed prior to a user interacting with an area of the road including the detrimental condition.

12. The computer-implemented method of claim 1, wherein a vehicle that is moving at a high or a low speed relative to other traffic is prioritized as having a greater need by the detecting for the illumination.

13. A computer program product for drone road lighting, the computer program product comprising a non-transitory computer-readable storage medium having program instructions embodied therewith, the program instructions executable by a computer to cause the computer to perform:
  detecting a need, irrespective of a user request, for illumination near a road based on a detrimental condition of the road;
  automatically deploying a drone to perform an illumination action based on the detected need; and
  changing the illumination action performed by the drone based on a learning from past illumination actions of the drone,
  wherein the detecting includes a sensing that enables a tracking of the need.

14. The computer program product of claim 13, wherein the detecting farther detects a presence of an obstacle in the road that cannot be viewed due to the need for illumination.

15. The computer program product of claim 13, wherein, when the need for illumination is detected, the detecting further acquires an image of the road, extracts, from the image of the road, at least one light halo produced by a lighting device of a vehicle, approximates a form of the light halo by an elliptic curve, and compares the form of the light halo with the elliptic curve obtained in order to deduce from the light halo a presence of an element obstacle with visibility.

16. A drone road lighting system, said system comprising:
  a processor; and
  a memory, the memory storing instructions to cause the processor to perform:
    detecting a need, irrespective of a user request, for illumination near a road based on a detrimental condition of the road;
    automatically deploying a drone to perform an illumination action based on the detected need; and
    changing the illumination action performed by the drone based on a learning from past illumination actions of the drone,
  wherein the detecting includes a sensing that enables a tracking of the need.

17. The system of claim 16, wherein the memory further stores instructions to cause the processor to further detect a presence of an obstacle in the road that cannot be viewed due to the need for illumination.

18. The system of claim 16, wherein, when the need for illumination is detected, the memory further stores instructions to cause the processor to:
  acquire an image of the road;
  extract, from the image of the road scene, at least one light halo produced by a lighting device of a vehicle;
  approximate a form of the light halo by an elliptic curve; and
  compare the form of the light halo with the elliptic curve obtained in order to deduce from the light halo a presence of an element obstacle with visibility.

19. The system of claim 16, wherein the detecting detects the need for illumination when a fog density exceeds a predetermined threshold and according to a view distance based on the fog density.

20. The system of claim 16, wherein the deploying pre-deploys the drone to an area based on a pre-determined weather forecast.

* * * * *